US008239114B2

(12) United States Patent
Goeke et al.

(10) Patent No.: US 8,239,114 B2
(45) Date of Patent: Aug. 7, 2012

(54) METHODS AND SYSTEMS FOR MODULATING FUEL FLOW FOR GAS TURBINE ENGINES

(75) Inventors: Jerry Lee Goeke, West Des Moines, IA (US); Brandon Philip Williams, Urbandale, IA (US)

(73) Assignee: Delavan Inc, West Des Moines, IA (US)

( * ) Notice: Subject to any disclaimer, the term of this patent is extended or adjusted under 35 U.S.C. 154(b) by 723 days.

(21) Appl. No.: 12/368,472

(22) Filed: Feb. 10, 2009

(65) Prior Publication Data

US 2009/0204306 A1   Aug. 13, 2009

Related U.S. Application Data

(60) Provisional application No. 61/028,136, filed on Feb. 12, 2008.

(51) Int. Cl.
*G06F 19/00* (2011.01)

(52) U.S. Cl. .......... 701/100; 123/472; 123/491; 60/742; 60/733; 431/1; 431/114; 239/585.1; 239/584

(58) Field of Classification Search ................... 701/100; 123/472, 435, 480, 491, 478, 506; 60/39.23, 60/776
See application file for complete search history.

(56) References Cited

U.S. PATENT DOCUMENTS

| | | | |
|---|---|---|---|
| 2,468,584 A | 4/1949 | Wotring |
| 2,975,785 A | 3/1961 | Sheldon |
| 3,352,155 A | 11/1967 | Penet |
| 3,532,121 A | 10/1970 | Sturman et al. |
| 3,689,773 A | 9/1972 | Wheeler |
| 3,762,442 A | 10/1973 | Paul |
| 3,772,540 A | 11/1973 | Benson |
| 4,521,088 A | 6/1985 | Masom |
| 4,709,155 A | 11/1987 | Yamaguchi et al. |
| 4,976,227 A | 12/1990 | Draper |
| 5,051,631 A | 9/1991 | Anderson |
| 5,071,105 A | 12/1991 | Donze et al. |
| 5,257,496 A | 11/1993 | Brown et al. |
| 5,303,684 A | 4/1994 | Brown et al. |

(Continued)

FOREIGN PATENT DOCUMENTS

EP   0 638 770 A1   2/1995

(Continued)

OTHER PUBLICATIONS

U.S. Appl. No. 12/116,928, Goeke et al.

(Continued)

*Primary Examiner* — Thomas Black
*Assistant Examiner* — Luke Huynh
(74) *Attorney, Agent, or Firm* — Scott D. Wofsy; Edwards Wildman Palmer LLP

(57) ABSTRACT

A method of combustion stability control for a gas turbine engine is provided, and includes the steps of receiving by a stability controller, information regarding environmental and operating conditions, and comparing the environmental and operating conditions to pre-programmed information to determine if a likelihood of combustion instability exists. The method further includes the steps of determining optimal fuel modulation frequency and amplitude for the environmental condition to reduce combustion instability, if a likelihood of combustion instability exists, and actuating at least one fuel modulation valve to, at the optimal fuel modulation frequency and amplitude, reduce combustion instability, if a likelihood of combustion instability exists. Systems for modulating fuel flow are also provided.

4 Claims, 10 Drawing Sheets

U.S. PATENT DOCUMENTS

| | | | |
|---|---|---|---|
| 5,404,709 | A | 4/1995 | Mac Lean et al. |
| 5,474,234 | A | 12/1995 | Maley |
| 5,488,340 | A | 1/1996 | Maley et al. |
| 5,608,515 | A | 3/1997 | Shu et al. |
| 5,784,300 | A | 7/1998 | Neumeier et al. |
| 5,791,889 | A | 8/1998 | Gemmen et al. |
| 5,797,266 | A | 8/1998 | Brocard et al. |
| 5,809,769 | A | 9/1998 | Richards et al. |
| 5,828,797 | A | 10/1998 | Minott et al. |
| 5,857,320 | A | 1/1999 | Amos et al. |
| 5,961,314 | A | 10/1999 | Myhre et al. |
| 6,058,709 | A | 5/2000 | Richards et al. |
| 6,059,560 | A | 5/2000 | Richards et al. |
| 6,142,665 | A | 11/2000 | Haffner et al. |
| 6,205,764 | B1 | 3/2001 | Hermann et al. |
| 6,205,765 | B1 | 3/2001 | Iasillo et al. |
| 6,244,291 | B1 | 6/2001 | Hughes |
| 6,454,548 | B2 | 9/2002 | Falk et al. |
| 6,517,045 | B1 | 2/2003 | Northedge |
| 6,566,158 | B2 | 5/2003 | Eriksen et al. |
| 6,598,621 | B1 | 7/2003 | Wygnanski |
| 6,640,548 | B2 | 11/2003 | Brushwood et al. |
| 6,672,071 | B2 | 1/2004 | Woltmann |
| 6,688,534 | B2 | 2/2004 | Bretz |
| 6,773,951 | B2 | 8/2004 | Eriksen et al. |
| 6,848,667 | B1 | 2/2005 | Wygnanski |
| 6,918,569 | B2 | 7/2005 | Jansen |
| 6,928,878 | B1 | 8/2005 | Eriksen et al. |
| 7,004,449 | B2 | 2/2006 | Jansen |
| 7,007,661 | B2 | 3/2006 | Warlick |
| 7,775,052 | B2 * | 8/2010 | Cornwell et al. ............... 60/803 |
| 2002/0125336 | A1 | 9/2002 | Bretz |
| 2002/0134138 | A1 | 9/2002 | Philipp et al. |
| 2003/0056490 | A1 | 3/2003 | Anderson et al. |
| 2003/0056517 | A1 | 3/2003 | Brushwood et al. |
| 2003/0155031 | A1 | 8/2003 | Barton et al. |
| 2004/0154300 | A1 | 8/2004 | Woltmann |
| 2005/0107942 | A1 | 5/2005 | Nomura et al. |
| 2005/0180699 | A1 | 8/2005 | Shu et al. |
| 2005/0189021 | A1 | 9/2005 | Wygnanski |
| 2005/0247066 | A1 | 11/2005 | Myhre |
| 2006/0000219 | A1 | 1/2006 | Myhre |
| 2006/0213200 | A1 | 9/2006 | Critchley et al. |
| 2006/0219968 | A1 | 10/2006 | Jansen |
| 2007/0119147 | A1 | 5/2007 | Cornwell et al. |
| 2007/0151252 | A1 | 7/2007 | Cornwell et al. |
| 2008/0000214 | A1 | 1/2008 | Kothnur et al. |
| 2009/0013693 | A1 | 1/2009 | Ols et al. |
| 2009/0026398 | A1 | 1/2009 | Overman et al. |
| 2009/0049927 | A1 | 2/2009 | Spivak et al. |
| 2009/0077945 | A1 | 3/2009 | Cornwell et al. |

FOREIGN PATENT DOCUMENTS

| | | |
|---|---|---|
| EP | 0 816 760 A1 | 1/1998 |
| EP | 0 926 325 A2 | 6/1999 |
| EP | 1 559 887 A2 | 8/2005 |
| GB | 2 342 504 | 4/2000 |
| GB | 2 342 782 | 4/2000 |
| GB | 2 377 555 | 1/2003 |
| GB | 2 380 064 A | 3/2003 |
| GB | 2 380 065 A | 3/2003 |
| JP | 08-68573 | 3/1996 |
| WO | WO 99/30006 | 6/1999 |
| WO | WO 00/20786 | 4/2000 |
| WO | WO 02/086364 A1 | 10/2002 |
| WO | WO 03/102454 A | 12/2003 |
| WO | WO 2005/047670 A2 | 5/2005 |
| WO | WO 2005/047670 A3 | 5/2005 |

OTHER PUBLICATIONS

U.S. Appl. No. 12/046,977, Williams et al.

U.S. Appl. No. 11/652,718, Myhre.

Hermann et al.; "Active Instability Control (AIC) of Spray Combustors by Modulation of the Liquid Fuel Flow Rate"; Combust. Sci. and Tech., 1996, vol. 118, pp. 1-25.

Paschereit et al.; "Acoustic Control of Combustion Instabilities and Emissions in a Gas-Turbine Combustor"; Proceedings of the 1998 IEEE.

Haile et al.; "Characterization of a Liquid Fuel Injector under Continuous and Modulated Flow Conditions"; Part. Part. Syst. Charact. 15 (1998) 136-144.

Cohen et al.; "Active Control of Combustion Instability in a Liquid-Fueled Low-N0x Combustor"; Journal of Engineering for Gas Turbines and Power, Apr. 1999, vol. 121/281.

Heising et al.; "Periodic Liquid Fuel Sprays Combustion Processes and Their Damping of Combustion Instabilities"; American Institute of Aeronautics and Astronautics, 1999.

Johnson et al.; "Effects of Time Delay and System Noise Upon Active Control of Unstable Combustors"; American Institute of Aeronautics and Astronautics, 2001-0778.

Murugappan et al.; "Application of Extremum Seeking Controller for Suppression of Combustion Instabilities in Spray Combustion"; American Institute of Aeronautics and Astronautics, 2000-1025.

Magill et al.; "Combustion Dynamics and Control in Liquid-Fueled Direct Injection Systems"; American Institute of Aeronautics and Astronautics, 2000-1022.

Darling et al.; "Demonstration of Active Control of Combustion Instabilities on a Fuel-Scale Gas Trubine Combustor"; ASME Turbo Expo, Jun. 4-7, 2001.

Wu et al.; "High Response Valve for Active Combustion Control"; Proceedings of ASME Turbo Expo, Jun. 4-7, 2001.

Johnson et al.; "Demonstration of Active Control of Combustion Instabilities on a Full-Scale Gas Turbine Combustor"; American Society of Mechanical Engineers, Apr. 11, 2002.

Hoff, et al., Closed-Loop Combustion Control using OH Radical Emissions, Proceedings of ASME TurboExpo, May 8-11, 2000, Munich Germany.

Natural Gas Fuel for General Electric Aircraft Derivative Gas Turbines in Industrial Applications, General Electric Company Marine & Industrial Engine Projects Department, Cincinnati, Ohio 45215, MID-TD-0001-1, Aug. 1985.

J.E. May; "Active Pattern Factor Control for Gas Turbine Engines", Published 1998 NASA. Available from http://www.grc.nasa.gov/WWW/RT/RT1997/5000/5540may.htm, Apr. 15, 1998 [cited based on URL content as of Jul. 9, 2009].

UK Search Report dated Jun. 15, 2009, for related UK application GB0902317.7.

UK Examination Report dated Feb. 22, 2012, for UK Application No. GB0902317.7.

\* cited by examiner

METHODS AND SYSTEMS FOR MODULATING FUEL FLOW FOR GAS TURBINE ENGINES

CROSS-REFERENCE TO RELATED APPLICATIONS

This application claims the benefit of priority to U.S. Patent Application Ser. No. 61/028,136, filed Feb. 12, 2008, which is incorporated herein by reference in its entirety.

FIELD OF THE INVENTION

The present invention relates to methods and systems for modulating fuel supplied to a gas turbine engine. Particularly, the present invention is directed to valve arrangements and methods for controlling such valve arrangements in gas turbine engines.

DESCRIPTION OF RELATED ART

Combustion instability is a significant problem in the design of low-emission, high performing combustion chambers for gas turbines. Combustion instability is generally understood as high amplitude pressure oscillations that occur as a result of the turbulent nature of the combustion process and the large volumetric energy release within the combustion chamber. Combustion instability diminishes engine system performance, and the vibrations resulting from pressure oscillations can damage hardware components, including the combustion chamber itself. Moreover, when the combustion heat release becomes in phase with and reinforces acoustic pressure waves, a thermo-acoustic instability results.

In the past, passive control methods were employed to correct combustion instability, including, for example, modifying the fuel injection distribution pattern, or changing the shape or capacity of the combustion chamber. Passive controls are often costly and limit combustor performance. More recently, active control methods have been used to correct combustion instability by modifying the pressure within the system.

U.S. Patent Publication No. 2007/0151252 to Cornwell et al., which is incorporated herein by reference, in its entirety, discloses a plurality of valve arrangements capable of operating at high frequency (of up to and beyond 1000 Hz) to provide fuel pulsations at the desired frequency to promote combustion stability, for example. The valves described therein provide rotating elements that modulate fuel, as commanded by a control system. Although the devices described can be embodied with multiple valve elements to result in a wide variety of flow conditions, applicants recognize that such valves can also be embodied with a single rotating valve element.

Applicants further recognize, that it would be advantageous to employ simple and effective and relatively inexpensive measures to utilize such pulsating valves to effectively manage combustion stability. The present invention provides a solution to these needs.

SUMMARY OF THE INVENTION

The purpose and advantages of the present invention will be set forth in and apparent from the description that follows. Additional advantages of the invention will be realized and attained by the methods and systems particularly pointed out in the written description and claims hereof, as well as from the appended drawings.

To achieve these and other advantages and in accordance with the purpose of the invention, as embodied, the invention includes a method of combustion stability control in a gas turbine engine. The method includes the steps of, determining environmental and operating conditions that cause combustion instability in the gas turbine engine, programming a controller with the environmental and operating conditions that cause combustion instability and with a fuel modulation pulsation frequency to counteract instability under any set of environmental and operating conditions, and providing at least one environmental sensor interfacing with the controller and at least one fuel modulation valve interfacing with the controller for modulating fuel flow to the gas turbine engine. Such environmental conditions can be those measured in or near the combustor of the turbine engine, or can be conditions measured by other sensors on an aircraft, such as an altitude or oxygen level sensor, for example. For example, an engine manufacturer can map any instabilities in advance and implement effective control schemes to reduce or eliminate the instabilities that may occur, such as by pulsing fuel flow at an appropriate frequency at an appropriate fuel pressure.

In accordance with another aspect of the invention, a method of combustion stability control for a gas turbine engine is provided. The method includes the steps of receiving, by a stability controller, information regarding environmental and operating conditions, and comparing the environmental and operating conditions to pre-programmed information to determine if a likelihood of combustion instability exists. The method further includes the steps of determining optimal fuel modulation frequency and amplitude for the environmental condition to reduce combustion instability, if a likelihood of combustion instability exists, and actuating at least one fuel modulation valve, at the optimal fuel modulation frequency and amplitude, to reduce combustion instability, if a likelihood of combustion instability exists.

In accordance with another aspect of the invention, a method of combustion stability control in a gas turbine engine is provided. The method includes the steps of receiving, by a stability controller, information from at least one sensor regarding combustion pressure wave amplitude and frequency, comparing the combustion pressure wave amplitude to a pre-programmed amplitude threshold to determine if excessive combustion instability exists, determining optimal fuel modulation frequency and amplitude for the fuel pulses required to reduce the amplitude of the combustion pressure wave, and actuating at least one fuel modulation valve to pulse fuel at a selected frequency and amplitude to reduce combustion pressure wave amplitude.

The selected frequency at which the fuel modulation valve pulses fuel can be substantially equal to the frequency of combustion pressure waves that exceed the pressure amplitude threshold, wherein the valve pulsation frequency is out-of-phase with the combustion pressure wave frequency. In accordance with this aspect of the invention, the respective control system can be adapted and configured to monitor combustion stability during and/or after modulation to drive combustion to within an acceptable limit. Such systems can further be adapted to compensate for a lag time in sensing an unstable combustion condition, such as by providing a learning and memory capability to a stability controller, for example.

Any system in accordance with the invention can be adapted and configured to continually pulse fuel flow, and to react to combustion instability by shifting the phase of fuel pulsations in order to interrupt instabilities. Preferably, however, it is envisioned that fuel pulsation is performed only when required due to instabilities, so as to not cause instabilities in the case of low magnitude combustion pressure waves, or wear out valve components prematurely. Even in cases where fuel flow is only pulsed when necessary, methods in accordance with the invention can include the step of adjusting a relative phase of fuel pulsation, with respect to instability pressure waves, in order to minimize the magnitude of combustion instability pressure waves.

In accordance with a further aspect of the invention, a system for modulating fuel flow in a gas turbine engine includes at least one combustion stability sensor for detecting combustion instability in a combustor of the gas turbine engine, and a control unit configured and adapted to receive combustion stability data from the at least one combustion stability sensor and to output a control signal based on the combustion stability data. The system also includes at least one fuel modulating valve configured and adapted to receive fuel from a fuel supply, and to receive a control signal from the control unit, and at least one fuel injector configured and adapted to receive fuel from the at least one fuel modulating valve, the at least one fuel injector delivering modulated fuel into a combustor of the turbine engine.

Any system in accordance with the invention can further include one or more of the following features, as set forth below.

A distribution manifold can be interposed between a fuel modulating valve and a plurality of fuel injectors, the manifold delivering fuel from the fuel modulating valve to the plurality of fuel injectors.

A flow divider valve can be interposed between the fuel supply and the modulating valve, the flow divider valve dividing the fuel flow into at least first and second fuel flows, diverted through at least first and second fuel circuits, respectively. The first fuel circuit can be in fluid communication with a first modulating valve, which in-turn is also in fluid communication with a first distribution manifold configured and adapted to deliver fuel to a first fuel circuit of each of a plurality of fuel injectors. The second fuel circuit can be in fluid communication with a second distribution manifold configured and adapted to deliver fuel to a second fuel circuit of the plurality of fuel injectors. The second modulating valve can be provided in the second fuel circuit, receiving fuel from the flow divider valve and delivering fuel to the second distribution manifold.

In accordance with another aspect, systems in accordance with the invention can further include a staging valve interposed between the fuel supply and the fuel modulating valves, fuel from the staging valve being split between first and second fuel circuits, delivering fuel to first and second modulating valves respectively, each of the first and second modulating valves being in fluid communication with and delivering fuel respectively to first and second distribution manifolds, the first and second distribution manifolds distributing fuel respectively to first and second sets of fuel injectors.

In accordance with the invention, systems can include a staging valve interposed between the fuel supply and a fuel modulating valve, fuel from the staging valve being split between first and second fuel circuits, the first fuel circuit being in fluid communication with a first modulating valve, which in turn is in fluid communication with and delivers fuel to a first distribution manifold, the second fuel circuit being in fluid communication with a second distribution manifold, the first and second manifolds distributing fuel respectively to first and second sets of fuel injectors.

Alternatively or additionally, systems can include a fuel distribution manifold configured and adapted to distribute fuel to a plurality of fuel injectors having integral fuel modulation valves. If desired, all fuel injectors can be provided with integral fuel modulation valves. Alternatively, a first set of fuel injectors can be provided with integral fuel modulation valves with a second set of fuel injectors being in direct fluid communication with the distribution manifold.

It is to be understood that both the foregoing general description and the following detailed description are exemplary and are intended to provide further explanation of the invention claimed.

BRIEF DESCRIPTION OF THE DRAWINGS

The accompanying drawings, which are incorporated in and constitute part of this specification, are included to illustrate and provide a further understanding of the method and system of the invention. Together with the description, the drawings serve to explain the principles of the invention, wherein.

DETAILED DESCRIPTION

Reference will now be made in detail to representative embodiments of the invention, examples of which are illustrated in the accompanying drawings. The methods and corresponding steps of the invention will be described in conjunction with the detailed description of the subject systems.

Open Loop Control System

In accordance with one aspect of the present invention, an open loop method of actively controlling combustion instability is provided. In accordance with this aspect, environmental conditions, which can include but are not limited to air pressure, temperature, altitude, oxygen concentration, fuel pressure, fuel to air ratio, fuel flow rate and air flow rate are measured, which data is input into a combustion stability control unit. The combustion stability control unit can be an independent control unit, or can be integrated into other controls, for example, an electronic engine control unit such as a FADEC. In accordance with this aspect, conditions known to cause combustion instability initiate a response from the combustion stability control to improve combustion stability by modulating fuel flow, as will be discussed in more detail below.

Figure 1:
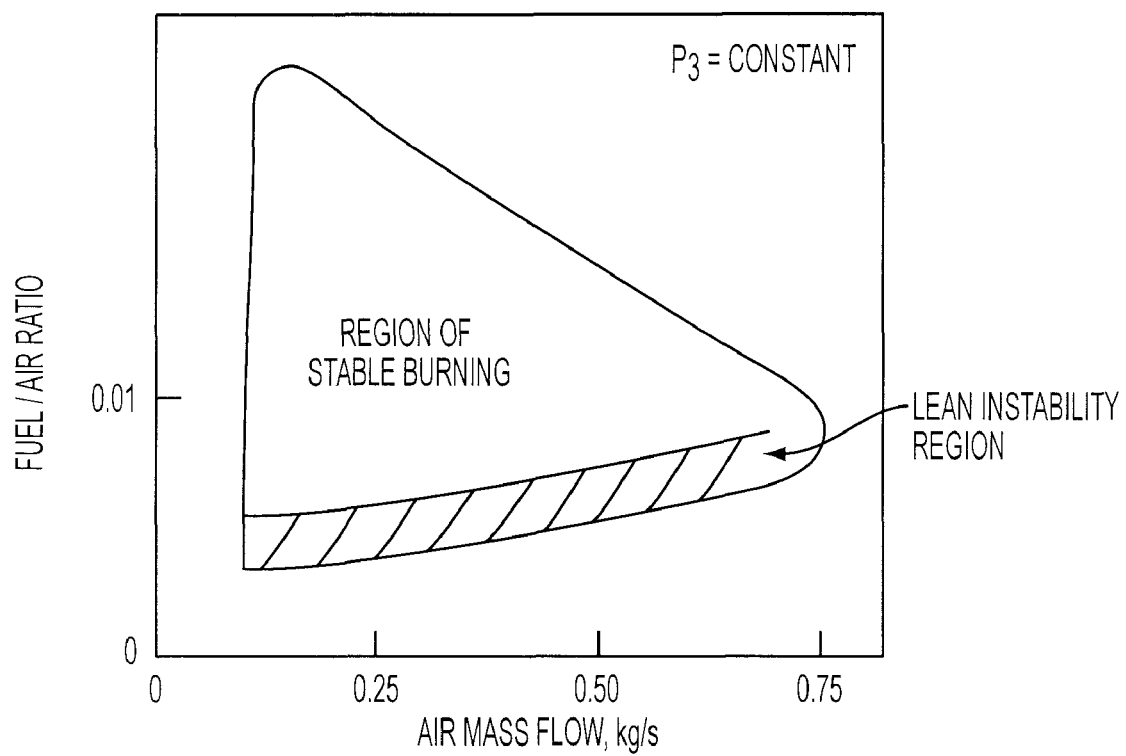
FIG. 1 illustrates typical region for stable combustion in gas turbine engines, illustrated at constant pressure.

FIG. 1 illustrates typical region for stable combustion in gas turbine engines, illustrated at constant pressure. As can be seen, by comparing the fuel to air ratio with the mass air flow, one can determine the likelihood of combustion instability for a given pressure. Applicants conceive that following design and/or manufacture of a turbine engine, the engine can be tested (physically and/or virtually by way of computer modeling) to determine the engine's precise combustion characteristics under different sets of environmental conditions. Conditions, which for that engine cause combustion instabilities, when detected, can initiate fuel modulation by the combustion stability control and fuel modulation valves.

Accordingly, combustion stability data is not directly required in accordance with open-loop combustion stability control in accordance with the present invention. However, advance knowledge of the operational characteristics of an engine is required, which in accordance with the invention can be mapped out and stored by the stability controller. The frequencies of the combustion instability under any given condition are also preferably investigated and known in advance, so that fuel can be modulated at a frequency to counteract a given frequency of combustion instability. Such frequency is preferably not a natural frequency of the combustor, and is one which most effectively interrupts the known unstable combustion condition for a given set of environmental and operating conditions. A fuel control valve then can be controlled to operate at the preferred frequency by the stability control unit.

Preferably, the amplitude of the fuel modulation is selected to reduce the magnitude of the combustion instability without overdriving the instability into a different unstable condition. This can be accomplished by appropriately controlling a modulation valve having variable fuel pressure modulation amplitudes, or by providing a fuel modulation valve in a size such that an excess of fuel is not delivered therethrough.

Figure 2:
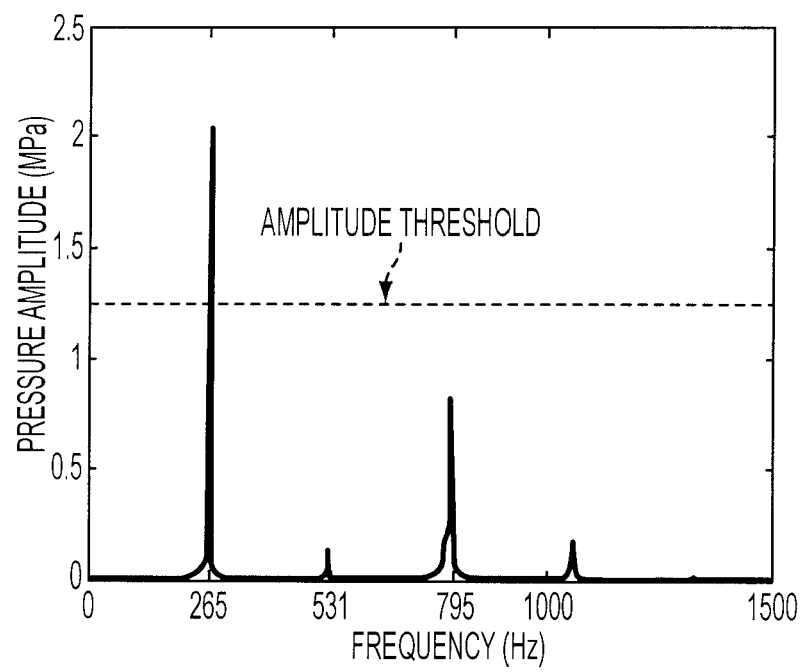
FIGS. 2 and 3 illustrate typical amplitudes and frequencies of instabilities for a single turbine engine operating under the same set of conditions without combustion stability control (FIG. 2), and with combustion stability control in accordance with the invention (FIG. 3)
Figure 3:
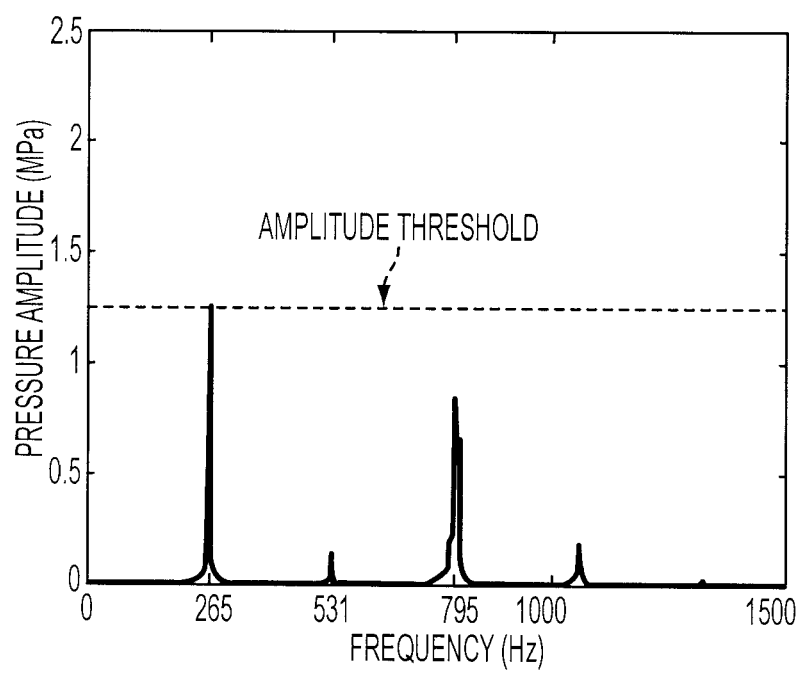

FIGS. 2 and 3 illustrate typical amplitudes and frequencies of instabilities for a single turbine engine operating under the same set of conditions without combustion stability control (FIG. 2), and with combustion stability control in accordance with the invention (FIG. 3). As illustrated in FIG. 2, the pressure amplitude of combustion instability at a frequency of 265 Hertz is above a predetermined amplitude threshold. Accordingly, the combustion stability system in accordance with the present invention is activated to reduce that pressure amplitude to be at or below the predetermined threshold.

Closed Loop Control System

In accordance with another aspect of the invention, the subject systems can be configured with and adapted for closed-loop control of combustion stability. In accordance with this aspect, a dynamic pressure sensor can be provided, incorporated with the combustion chamber. Alternatively or additionally other sensors described in U.S. patent publication number 2007/0119147 to Cornwell et al., which is incorporated herein by reference in its entirety, can be utilized.

Preferably, any sensors provided are capable of sensing both combustion pressure frequency and amplitude. When the amplitude of combustion instability exceeds a predetermined threshold, as set forth above and described in connection with FIGS. 1 and 2, the valve or valves incorporated in the subject systems are controlled to pulse at a frequency known to interrupt a given frequency of instability, or alternatively at the frequency of instability, but out of phase therewith.

Moreover, the amplitude of the pulsations can be adjusted such that they effectively minimize instabilities without driving a different unstable combustion condition. In accordance any embodiment set forth herein, the amplitude of fuel pulsations can be adjustable, such that the amplitude of fuel pulsations created by the fuel modulating valves can be reduced gradually in proportion with a decrease in combustion instability, or conversely provide increasing fuel pulsation pressure amplitudes as combustion instabilities increase. The valves described in U.S. patent publication No. 2007/0151252 to Cornwell et al., are capable of providing such selectable fuel delivery pressure amplitudes and frequencies.

Systemization

Fuel modulation, in accordance with the invention, can be achieved by modulating fuel valves provided for individual fuel injectors, provided on a manifold feeding multiple fuel injectors, or can be used to control fuel flow through one or multiple fuel circuits of multi-stage fuel injectors, as will be described in more detail below in connection with FIGS. 6-12. Valves for use with systems and methods in accordance with the invention can be single amplitude modulation valves, have multiple or infinite fuel modulation amplitudes, as desired or required. Some examples of fuel modulation valves that can be used in accordance with the invention are described by U.S. patent publication 2007/0151252 to Cornwell at al., which application is hereby incorporated by reference in its entirety.

Figure 4:
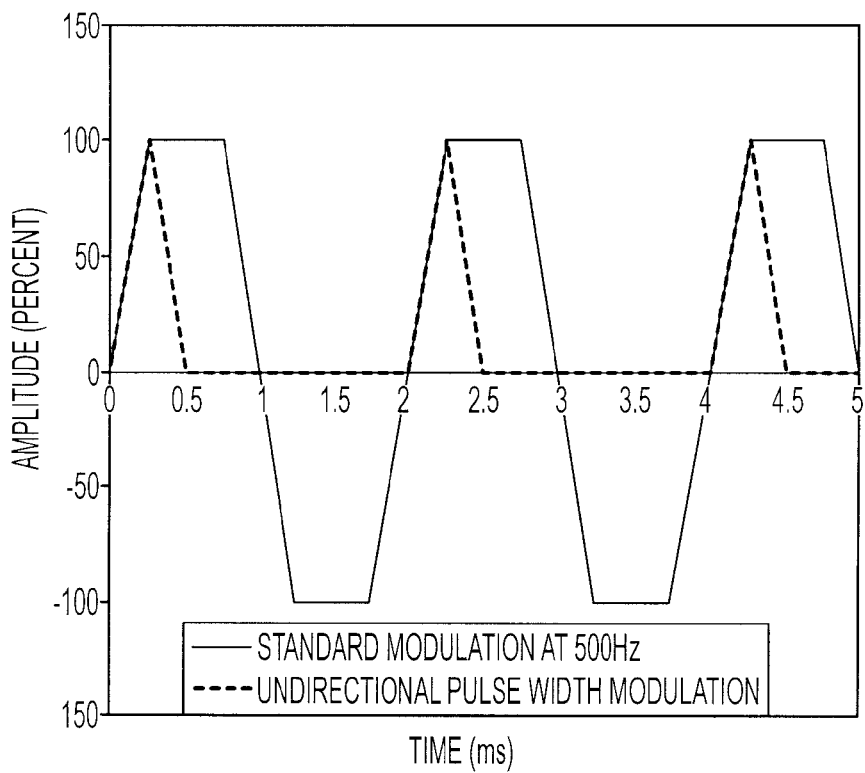
FIGS. 4 and 5 illustrate two example modulation schemes in comparison with standard modulation occurring at a frequency of 500 Hertz.
Figure 5:
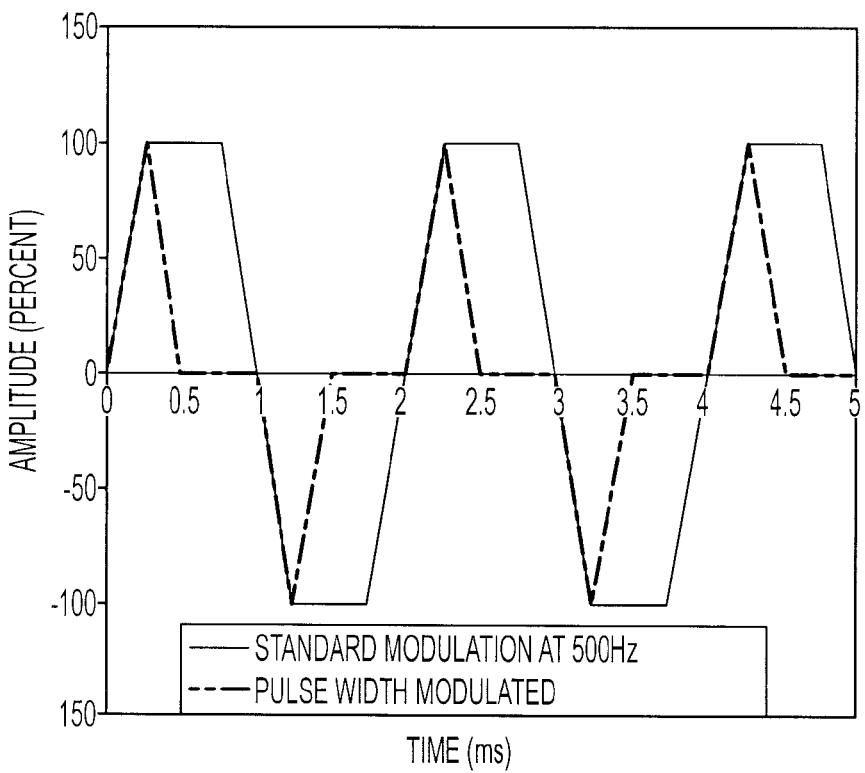

FIGS. 4 and 5 illustrate two example modulation schemes in comparison with standard modulation occurring at a frequency of 500 Hertz. In FIG. 4, the solid line represents the standard 500 Hertz modulation, which varies fuel pressure by ±100% about a mean fuel pressure. As shown, the fuel pressure only resides at the mean pressure instantaneously, but remains at a maximum and minimum for a predetermined period of time—in this case, for 0.5 milliseconds. Also illustrated is a unidirectional pulse-width modulation in accordance with the invention, where fuel pressure is maintained at the mean fuel rate for a predetermined period of time—in this case for 1.5 milliseconds, and increased up to a maximum pressure and back down to the mean fuel pressure. Such unidirectional modulation can alternatively occur toward a minimum, where instead of increasing the instantaneous fuel pressure amplitude, it is decreased momentarily.

As illustrated in FIG. 5, pulse width modulation can alternatively be performed in accordance with the invention bidirectionally, alternating between a momentary fuel pressure increase to a maximum and a fuel pressure decrease to a minimum, remaining for a predetermined length of time at the mean pressure—in this case, for 1.0 milliseconds. Systems and methods in accordance with the invention provide for any of the fuel pressure modulation schemes set forth above, including the illustrated standard modulation. Naturally, the relative pressure magnitudes and pulse duration and frequency can be preselected in advance, depending on the engine characteristics and the frequency of instability. Alternatively or additionally, a feedback control arrangement can be implemented to actively adjust the fuel pressure and modulation frequency during the combustion stability control process, and modify the frequency, amplitude and duration of the pulses. In closed-loop systems in accordance with the invention, a phase shift between fuel modulation by one or more valves and a detected combustion instability can be monitored, a controller being configured to increase or decrease the pressure amplitude of the stability control system.

Systems in accordance with the invention, as set forth above, can be triggered to respond by controlling combustion stability when the amplitude of pressure waves exceeds a predetermined threshold value, as shown in FIG. 2. The systems can be configured such that when a particular frequency and amplitude of instability is anticipated in open loop control, or alternatively, detected by one or more sensors in closed-loop control, that one or more modulating valves are triggered to actuate for a predetermined length of time. Thereafter, the presence of combustion instability can be determined, and the fuel modulation valve can be reactivated for another predetermined duration. Alternatively, the valves can be operated continually, with a stability determination being made continually.

Figure 6:
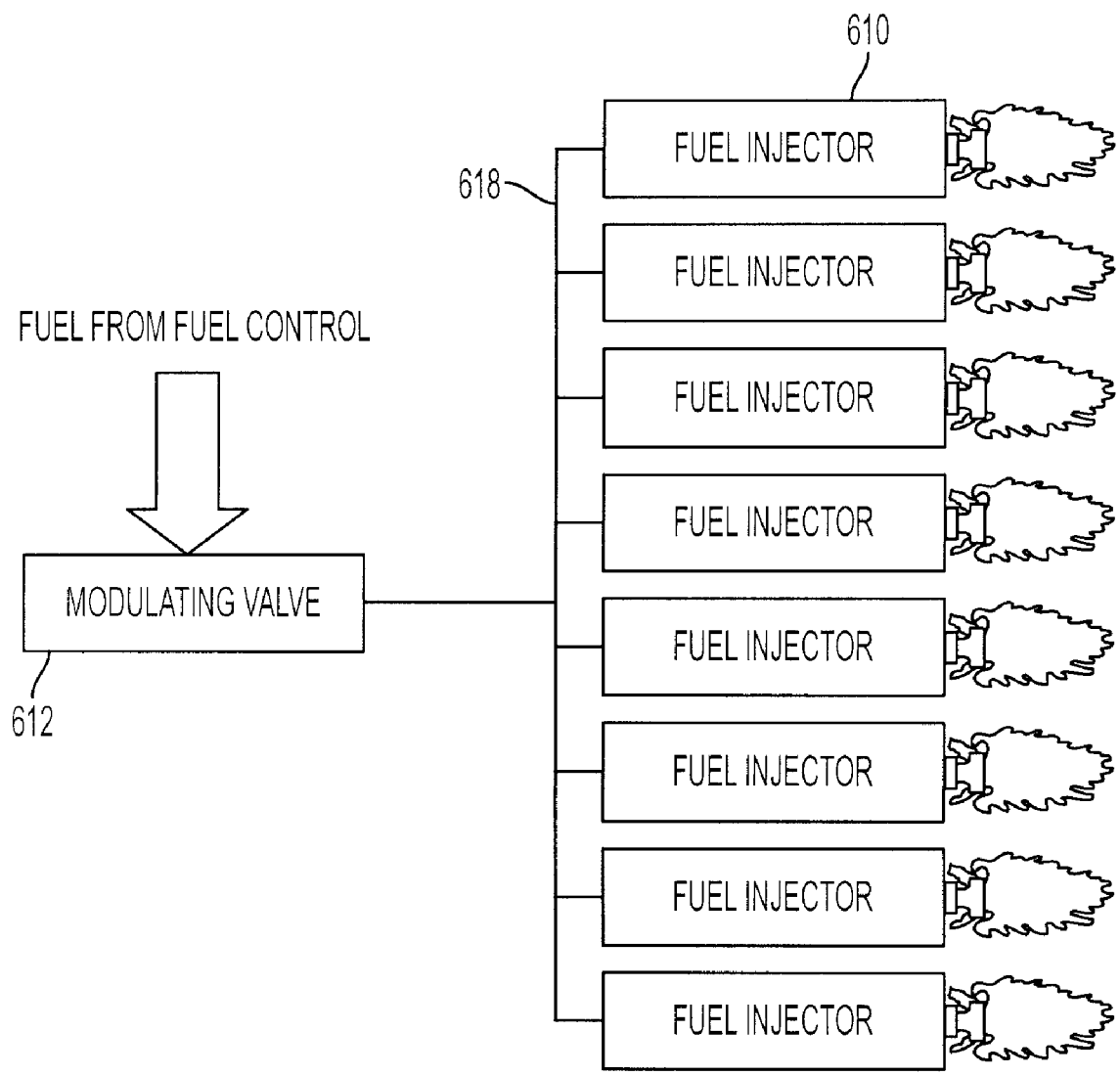
FIG. 6 illustrates one valve arrangement for systems in accordance with the invention, in which fuel from a fuel control system is supplied through a modulating valve that in-turn provides modulated fuel to a plurality of fuel injectors through a single distribution manifold.

FIG. 6 illustrates an example valve arrangement for systems in accordance with the invention, in which fuel from a fuel control system is supplied through a modulating valve 612 that in-turn provides modulated fuel to a plurality of fuel injectors 610 through a single distribution manifold 618.

Figure 7:
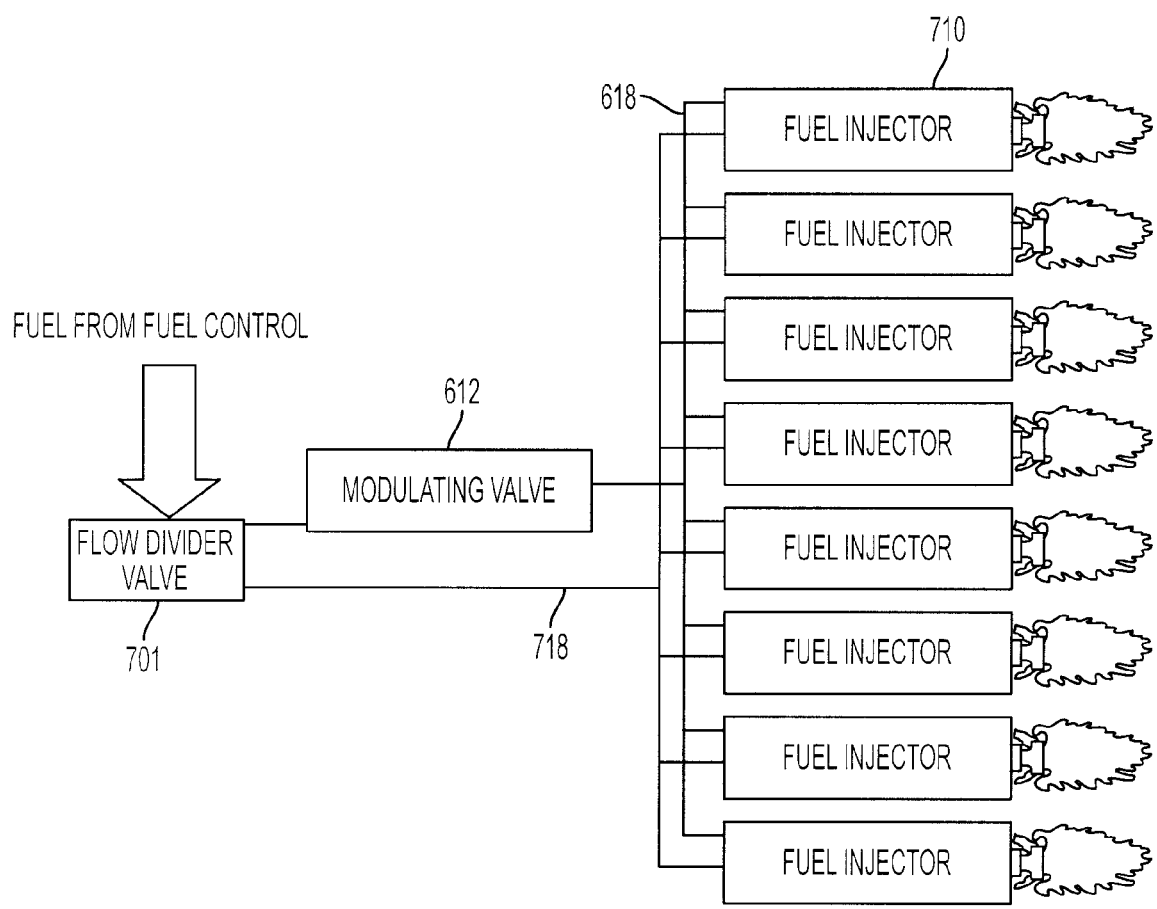
FIG. 7 shows an alternate arrangement of valves for systems in accordance with the invention, wherein a flow divider valve is provided to divide fuel from a fuel control to two different fuel circuits feeding the same set of piloted fuel injectors.

FIG. 7 shows an alternate valve arrangement for systems in accordance with the invention, wherein a flow divider valve 701 is provided to divide fuel from a fuel control to two different fuel circuits feeding the same set of piloted fuel injectors 710. One fuel circuit provides fuel directly to one fuel circuit of a piloted fuel injector 710 (e.g., the main fuel circuit) by way of a manifold 718. The other fuel circuit includes a modulating valve 612, which then delivers fuel to another distribution manifold 618, which feeds a second circuit of the fuel injectors 710, such as the pilot fuel circuit thereof.

Figure 8:
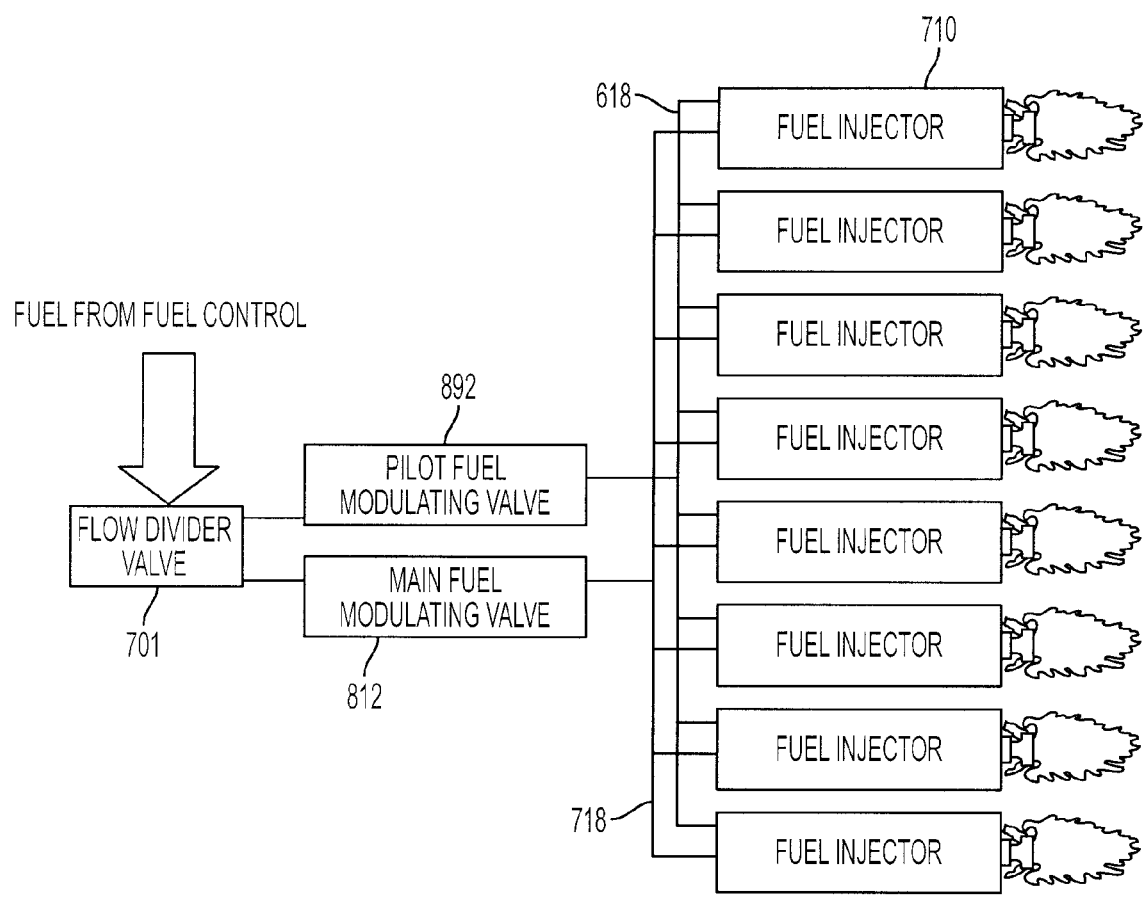
FIG. 8 illustrates a variation of the valve arrangement of FIG. 7, in which fuel through both the main and pilot fuel circuits can be modulated with respective modulating valves.

FIG. 8 illustrates a variation of the arrangement of FIG. 7, in which fuel through both the main and pilot fuel circuits can be modulated with respective modulating valves 812 and 892. Each valve 812, 892 provides fuel to respective fuel manifolds 718, 618 that feed respective fuel circuits of the same set of fuel injectors 710, such as the main and pilot fuel circuits thereof.

Figure 9:
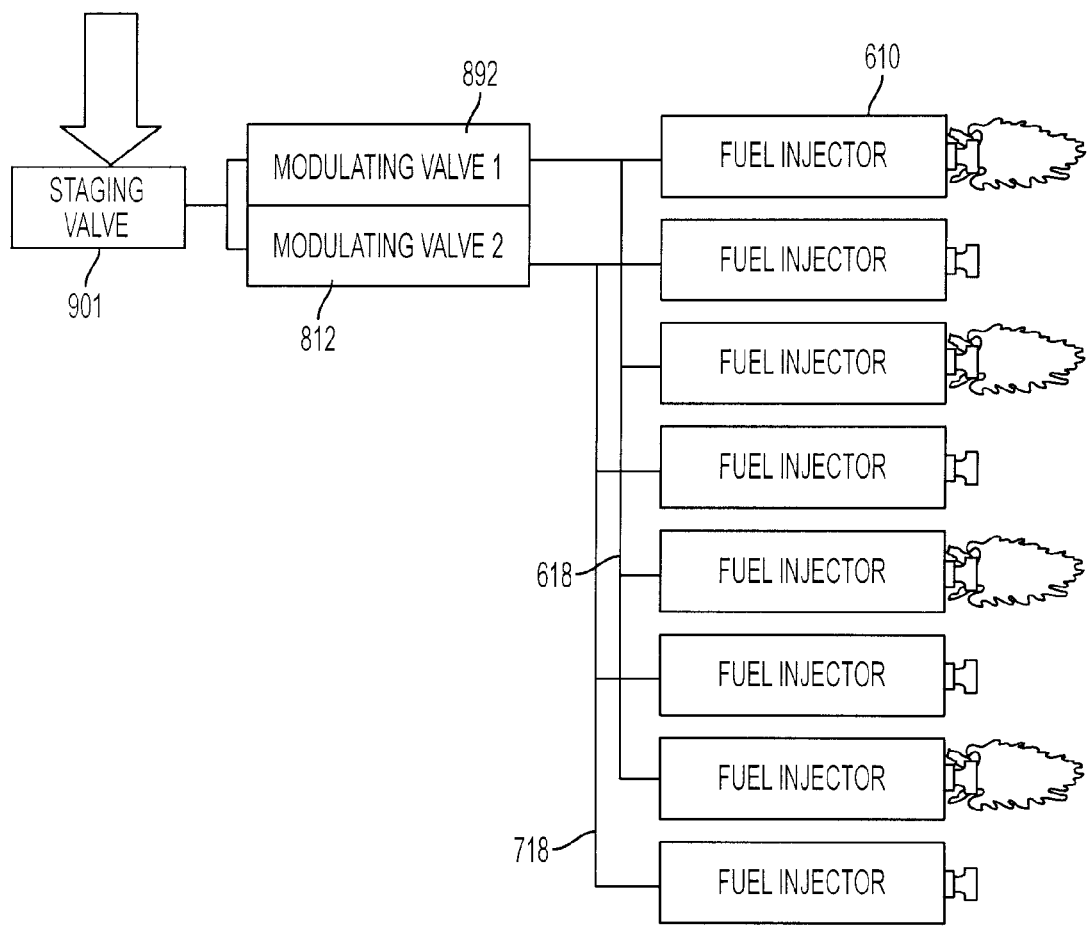
FIGS. 9 and 10 illustrate further valve arrangements for systems in accordance with the invention, where a staging valve is provided in series with one or more modulating valves.
Figure 10:
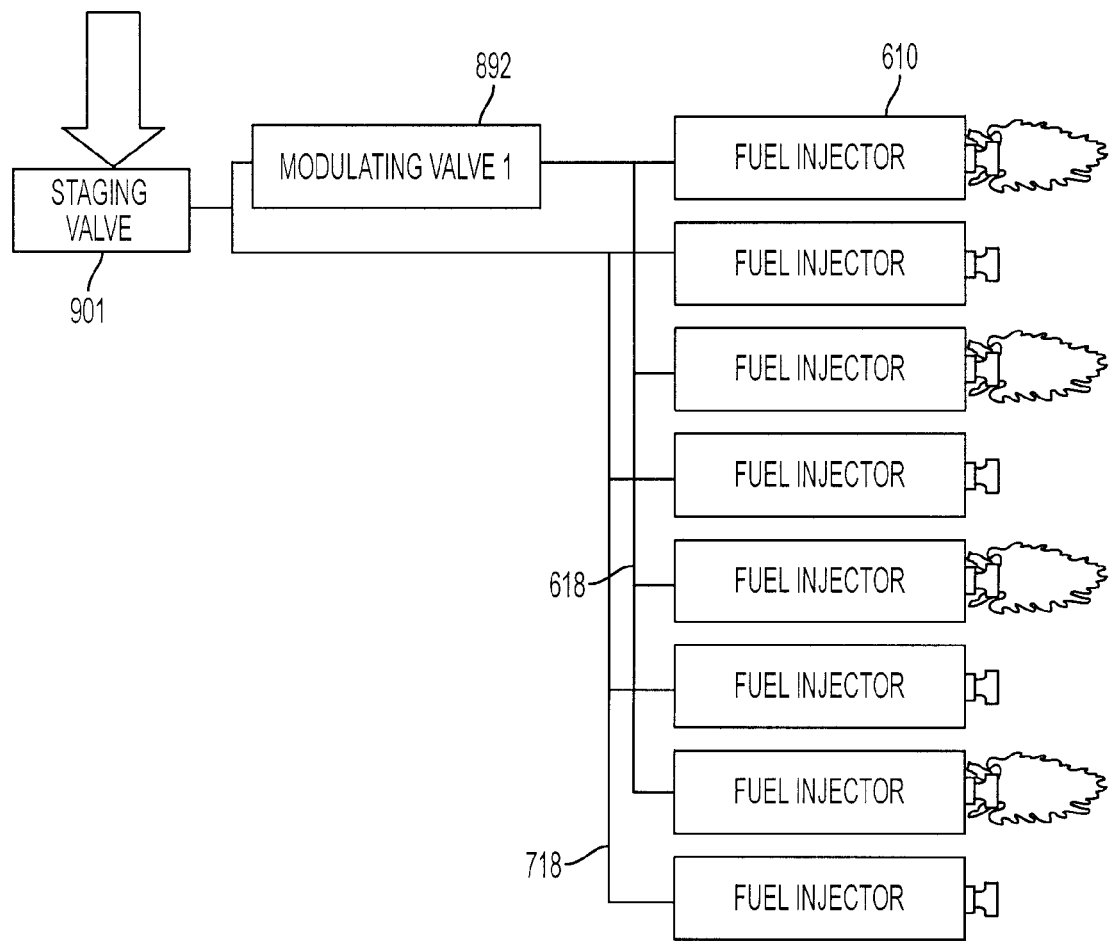

FIGS. 9 and 10 illustrate further valve arrangements in accordance with the invention, where a staging valve 901 is provided in series with one or more modulating valves. Alternatively, staging valve capability can be incorporated with the modulating valves. As illustrated in FIG. 9, respective manifolds 618, 718 are provided and deliver fuel to separate sets of fuel injectors 610 though separate modulating valves 812, 892. This arrangement allows separate control of different sets of fuel injectors. Alternatively, separate staging valves can be provided for each of the two fuel circuits, allowing the fuel injectors 610 associated with those fuel circuits to be shut off independently from others. As illustrated in FIG. 10, is possible to utilize only one fuel modulating valve 892 to provide fuel modulation capability, and stability control, to one set of injectors.

Figure 11:
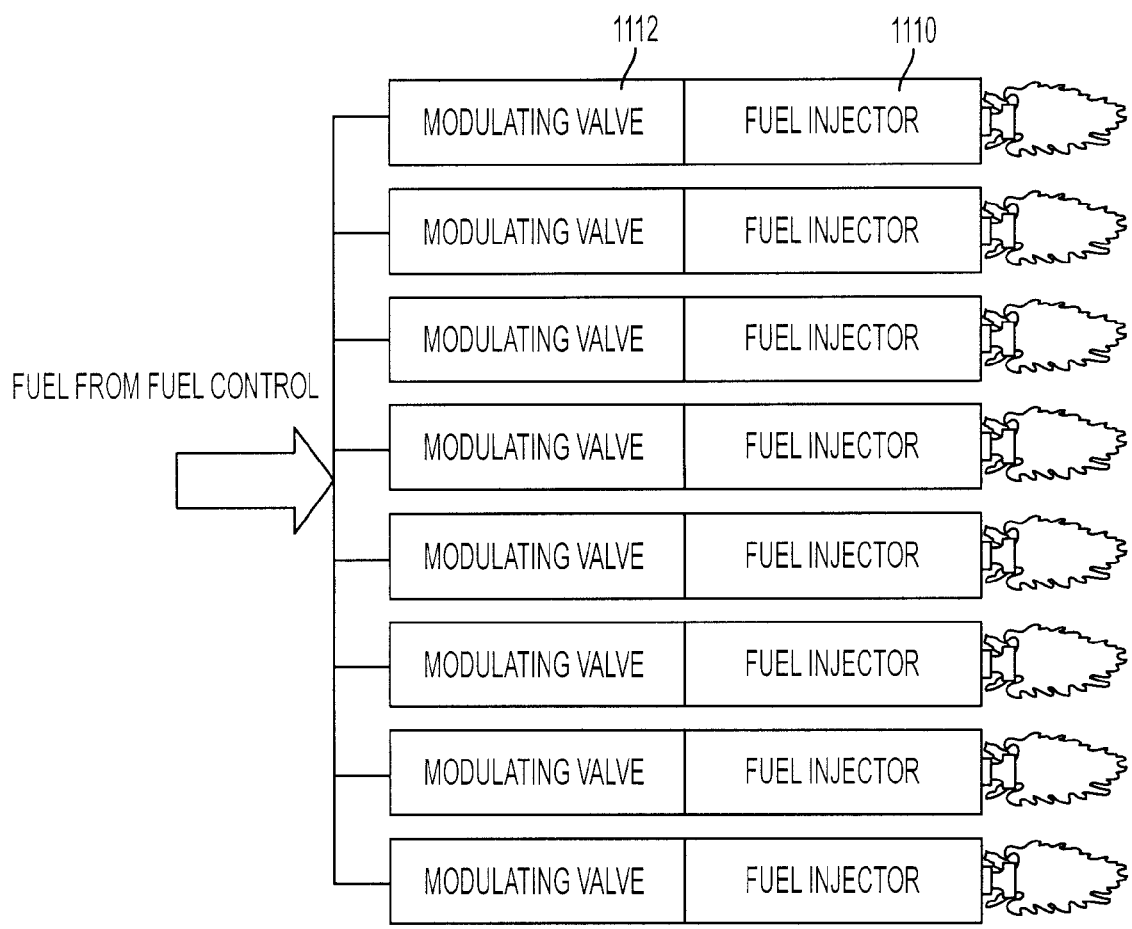
FIGS. 11 and 12 illustrate a valve arrangement for systems in accordance with the invention, in which individual modulating valves are associated with only selected or alternatively with all fuel injectors.
Figure 12:
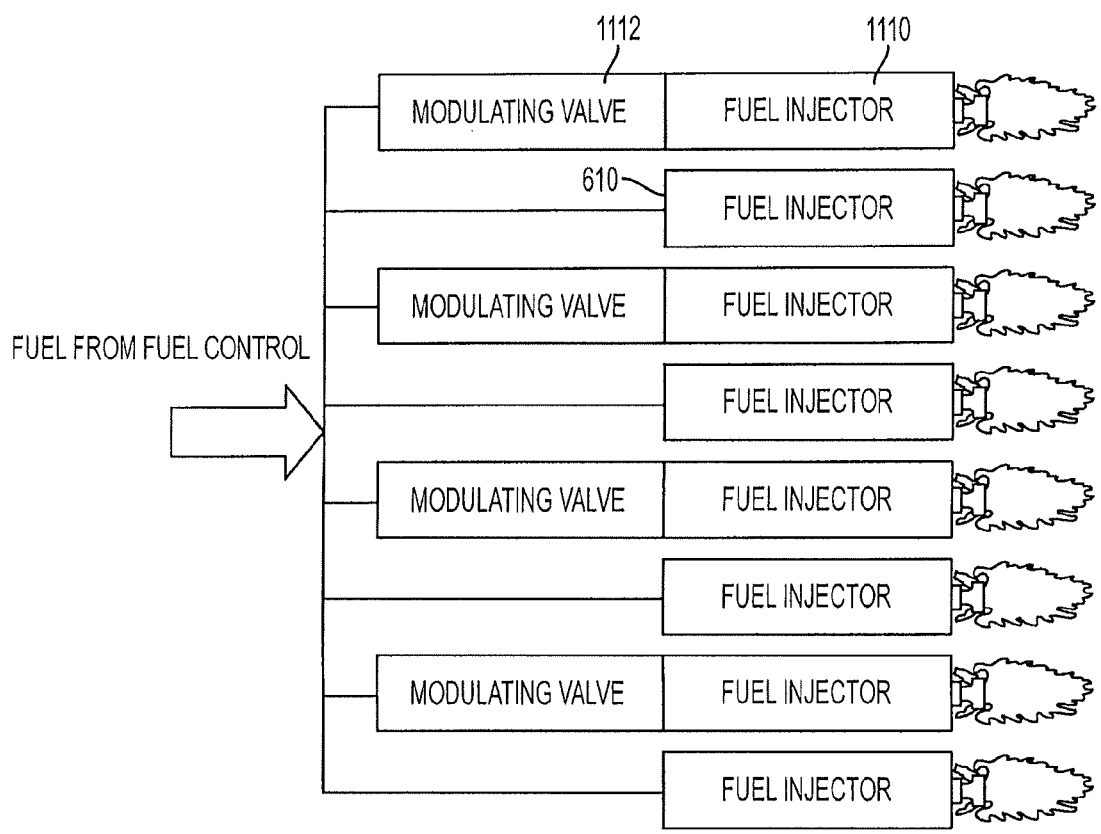

FIGS. 11 and 12 illustrate a valve arrangement for systems in accordance with the invention, in which individual modulating valves 1112 are associated with only selected or alternatively with all fuel injectors 1110. The fuel modulating valves 1112 can be incorporated into the body of the fuel injector 1110, or can be connected thereto by a fuel conduit.

As illustrated in FIG. 11, fuel modulating valves 1112 can be individually associated with each fuel injector 1110. As shown in FIG. 12, modulating valves 1112 can be associated with only certain fuel injectors 1110 and not with other injectors 610. It is to be understood, however, that staging valves can be provided at any point in the systems of FIGS. 11 and 12, and that the modulating valves 1112 can be embodied to provide fuel staging functionality.

The methods and systems of the present invention, as described above and shown in the drawings, provide for versatile and robust fuel modulation and stability control systems for gas turbine engines. It will be apparent to those skilled in the art that various modifications and variations can be made in the devices, systems and methods of the present invention without departing from the spirit or scope of the invention.

What is claimed is:

1. A method of combustion stability control in a gas turbine engine, the method comprising:
    a) receiving by a stability controller information regarding environmental and operating conditions;
    b) comparing the environmental and operating conditions to pre-programmed information to determine if a likelihood of combustion instability exists;
    c) determining optimal fuel modulation frequency and amplitude for the environmental conditions to reduce combustion instability, if a likelihood of combustion instability exists; and
    d) actuating at least one fuel modulation valve to, at the optimal fuel modulation frequency and amplitude, reduce combustion instability, if a likelihood of combustion instability exists.

2. A method of combustion stability control in a gas turbine engine, the method comprising:
    a) receiving by a stability controller information from at least one sensor regarding combustion pressure wave amplitude and frequency;
    b) comparing the combustion pressure wave amplitude to a pre-programmed amplitude threshold to determine if excessive combustion instability exists;
    c) determining optimal fuel modulation frequency and amplitude for the frequency of pressure waves to reduce the amplitude of the combustion pressure wave; and
    d) actuating at least one fuel modulation valve to pulse fuel at a selected frequency and amplitude to reduce combustion pressure wave amplitude.

3. The method of claim 2, further comprising:
    selecting a fuel modulation frequency at which the fuel modulation valve pulses fuel that is substantially equal to the frequency of combustion pressure waves that exceed the pressure amplitude threshold, wherein the valve pulsation frequency is out-of-phase with the combustion pressure wave frequency.

4. The method of claim 3, further comprising:
    adjusting a relative phase of fuel pulsation, with respect to instability pressure waves, to minimize the magnitude of combustion instability pressure waves.

* * * * *